No. 801,094. PATENTED OCT. 3, 1905.
E. J. KRENEK.
INSECT CATCHER.
APPLICATION FILED JAN. 21, 1905.
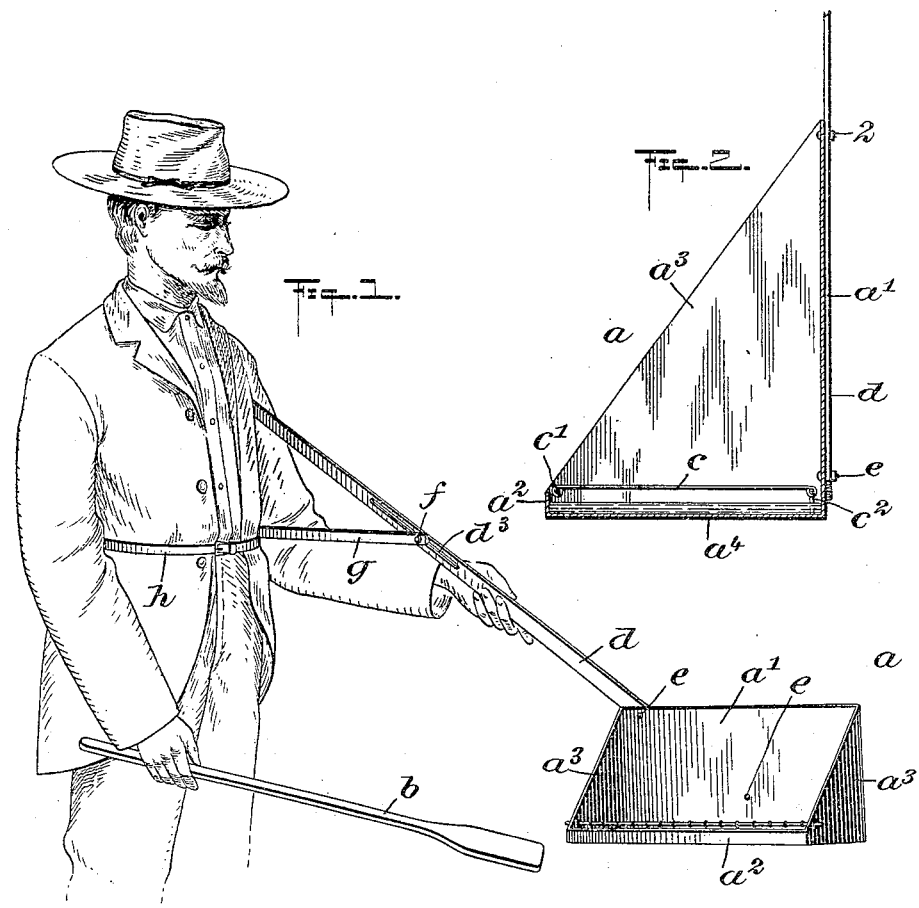
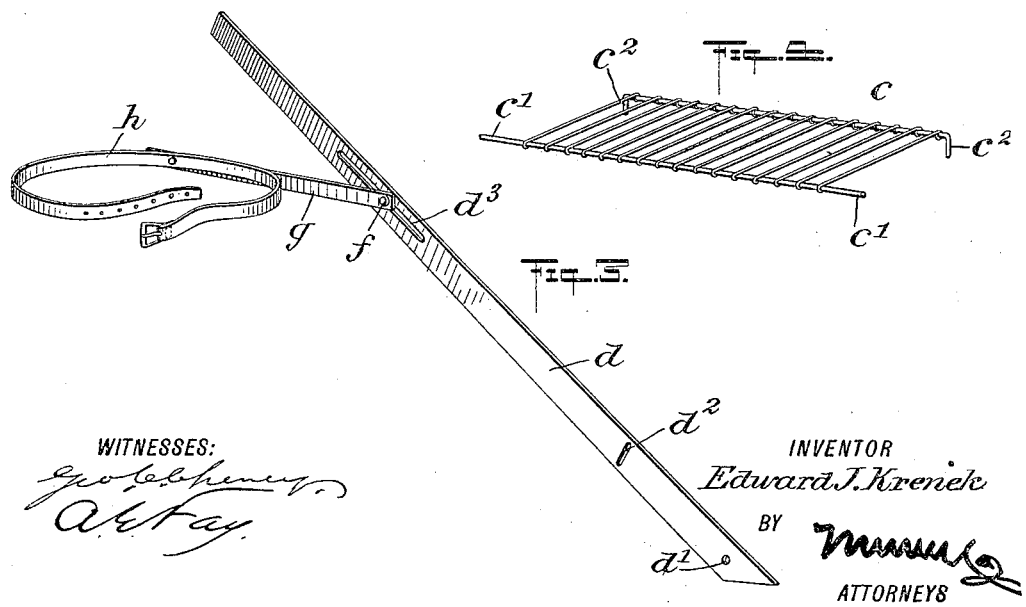
WITNESSES:
INVENTOR
Edward J. Krenek
BY
ATTORNEYS

UNITED STATES PATENT OFFICE.

EDWARD JOSEPH KRENEK, OF LAGRANGE, TEXAS.

INSECT-CATCHER.

No. 801,094.　　　　　Specification of Letters Patent.　　　　　Patented Oct. 3, 1905.

Application filed January 21, 1905. Serial No. 242,076.

*To all whom it may concern:*

Be it known that I, EDWARD JOSEPH KRENEK, a citizen of the United States, and a resident of Lagrange, in the county of Fayette and State of Texas, have invented a new and Improved Insect-Catcher, of which the following is a full, clear, and exact description.

My invention relates to a device for catching and destroying cotton-boll weevils and other insects.

The principal object of the invention is to provide means for catching insects when dislodged from plants upon which they are found and to provide means for holding coal-oil or other liquid in such a position that they will necessarily fall into it.

Reference is to be had to the accompanying drawings, forming a part of this specification, in which similar characters of reference indicate corresponding parts in all the figures.

Figure 1 is a perspective view showing the manner of using my invention and illustrating one form thereof. Fig. 2 is a tranverse sectional view of the main portion of the form of my invention shown in Fig. 1. Fig. 3 is a perspective view of a supporting device for the insect-catcher, and Fig. 4 is a perspective view of a detail.

The main part of the catcher comprises a receptacle, indicated in a general way by the letter $a$. This receptacle is provided with a rear wall $a'$, a comparatively low front wall $a^2$, and substantially triangular end walls $a^3$. Above the bottom $a^4$ is consequently provided a space for the reception of coal-oil or any other liquid adapted to be used for destroying insects. The sloping edges of the end walls provide a proper opening for the admission of the insects, and the general shape of the device, as indicated, is such as to permit the insects to be readily caught when they drop from the bushes or other plants upon which they may be found. It is intended to use a paddle $b$ for dislodging them from the plants into the receptacle $a$.

Above the liquid in the receptacle I prefer to locate a lattice-work $c$. This is provided with a pair of projections $c'$ upon opposite ends and with a pair of downwardly-extending projections $c^2$. The projections $c'$ pass through openings in the ends $a^3$ of the receptacle, and consequently the lattice is pivotally connected with the receptacle near the front thereof and can be swung from a horizontal position in the receptacle to a similar position outside, which will permit the contents of the receptacle below the lattice to be removed. The projections $c^2$ act as legs for supporting the lattice at the rear of the receptacle.

Upon the back of the rear wall $a'$ a handle $d$ is secured. The handle is preferably provided with perforations $d'$ and $d^2$, the latter being elongated, so as to provide for adjustment. Bolts $e$ are provided for securing the handle to the wall $a'$ through these perforations. The handle is also provided with a longitudinal elongated slot $d^3$, through which passes a bolt or stud $f$, connected with a bar $g$, which is in turn connected with a strap $h$, adapted to pass around the waist of the operator. After the adjustment of the bolt $f$ in the slot $d^3$ and also after the adjustment of one of the bolts $e$ in the slot $d^2$ the device can be supported, as indicated in Fig. 1, with the strap $h$ around the waist and the end of the handle $d$ under the arm of the operator. The paddle $b$ can then be held in the other hand, and the operation thereof will be obvious.

While I have illustrated and described one embodiment of my invention, it is to be understood that it is not limited to the form shown, but may be embodied in many other forms.

Having thus described my invention, I claim as new and desire to secure by Letters Patent—

1. An insect-catcher, comprising a receptacle having a space for liquid, a lattice over said space, a handle projecting angularly from the receptacle, an arm connected with the handle, and a flexible connection mounted on the arm for assisting in supporting the receptacle.

2. An insect-catcher comprising a receptacle having a space for liquid, a handle projecting angularly from the receptacle and having a longitudinal slot, an arm pivotally connected with the handle in said slot, and a strap connected with the arm for assisting in supporting the receptacle.

3. An insect-catcher comprising a receptacle having a bottom, a back, a front extending upwardly a short distance from said bottom and providing a space for liquid, a handle secured to said back and projecting at an angle therefrom, and an arm connected with the handle.

4. An insect-catcher, comprising a receptacle having a bottom, a back, triangular ends, a short vertical front providing a space for liquid, and a lattice located parallel with the bottom near the top of the front.

In testimony whereof I have signed my name to this specification in the presence of two subscribing witnesses.

EDWARD JOSEPH KRENEK.

Witnesses:
RUDOLPH PEWETZ,
FR. W. KUBALA.